Dec. 24, 1963    J. A. PAGET ETAL    3,115,453
EMERGENCY SHUTDOWN FOR NUCLEAR REACTORS
Filed Aug. 2, 1961    3 Sheets-Sheet 3

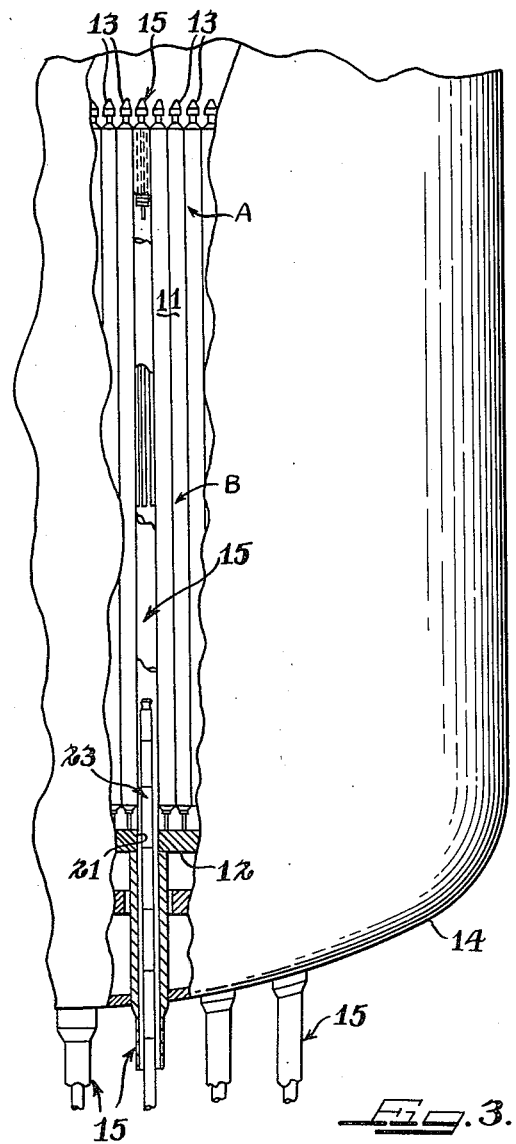

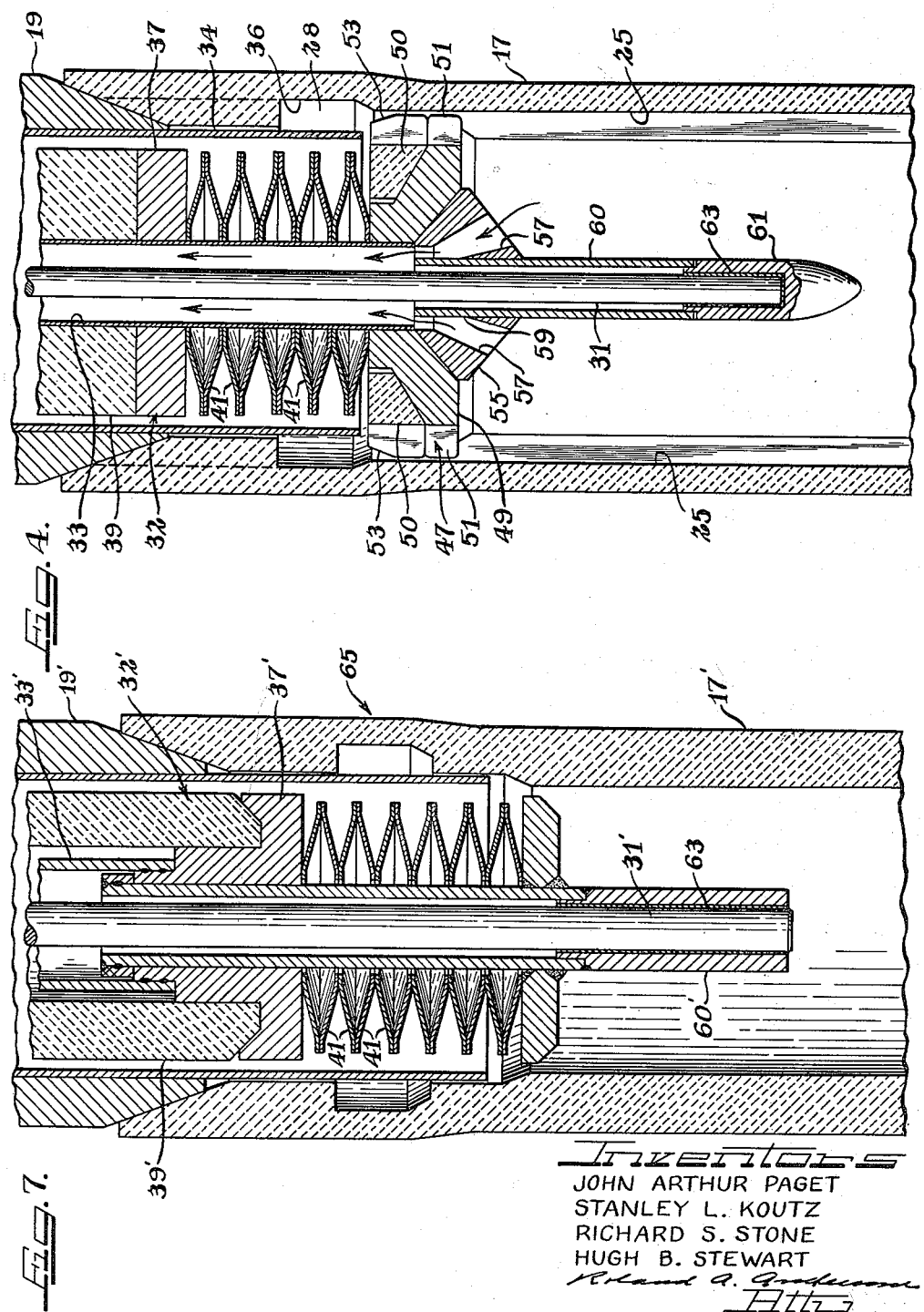

INVENTORS
JOHN ARTHUR PAGET
STANLEY L. KOUTZ
RICHARD S. STONE
HUGH B. STEWART

United States Patent Office 3,115,453
Patented Dec. 24, 1963

3,115,453
EMERGENCY SHUTDOWN FOR NUCLEAR REACTORS
John Arthur Paget, Poway, Stanley L. Koutz, San Diego, Richard S. Stone, Del Mar, and Hugh B. Stewart, Rancho Santa Fe, Calif., assignors, by mesne assignments, to the United States of America as represented by the United States Atomic Energy Commission
Filed Aug. 2, 1961, Ser. No. 128,909
3 Claims. (Cl. 204—193.2)

The present invention relates generally to nuclear reactors and, more particularly, it relates to emergency shutdown apparatus for nuclear reactors.

Nuclear reactors at present include a core which contains a quantity of fissionable material or fuel. The fissionable material is ordinarily distributed through the core in vertical cylindrical tubes to provide sufficient reactivity to sustain a nuclear chain reaction at a preselected power level.

Control rods are provided in the core of a nuclear reactor to control and regulate the power level at which the reactor operates. These control rods comprise a material which is capable of absorbing neutrons when the control rod is selectively positioned within the core of the reactor, thereby enabling a decrease or increase of the neutron flux in the core and thereby controlling the power level of the reactor.

It is normal practice, in nuclear reactor design, to include control rods which normally are in a withdrawn position from the reactor core, but which may rapidly be inserted in the core in an emergency. These control rods comprise sufficient neutron-absorbing material to absorb a substantial portion of the neutrons emitted by fission of the reactor fuel, and thereby stop the chain reaction. Such emergency control rods are commonly known as "scram rods."

It is desirable that the operability of the emergency control rods be insured, insofar as possible, and it is further desirable that their operation be automatically triggered whenever the power level of the reactor exceeds a predetermined safe level. Various mechanical and electro-mechanical systems have been devised to accomplish automatic scram operation, and auxiliary sources of operating power are usually provided for these systems in the event that normal power is lost under emergency conditions.

It is a primary object of the present invention to provide improved shutdown apparatus for a nuclear reactor. A more particular object of the present invention is to provide improved emergency shutdown apparatus for a nuclear reactor. An additional object of the present invention is to provide emergency shutdown apparatus for a nuclear reactor, which shutdown apparatus is automatically operable at a preselected abnormal power level on loss of coolant flow in the reactor. Other objects and advantages of the present invention will become apparent from the following detailed description and from the drawings, of which:

FIGURE 1 is a fragmentary schematic representation, partly broken away, of the core, fuel elements, and control rod assemblies of a nuclear reactor in accordance with the present invention;

FIGURE 2 is a fragmentary, longitudinal sectional view, partly broken away, of the control rod assembly and adjacent fuel rods of FIGURE 1;

FIGURE 3 is an enlarged cross-sectional view taken along lines 3—3 of FIGURE 2;

FIGURE 4 is an enlarged fragmentary, longitudinal sectional view of the emergency control rod assembly shown in FIGURE 2;

FIGURE 7 is an enlarged, fragmentary, longitudinal sectional view of the emergency control rod assembly shown in FIGURE 6.

Figure 5:
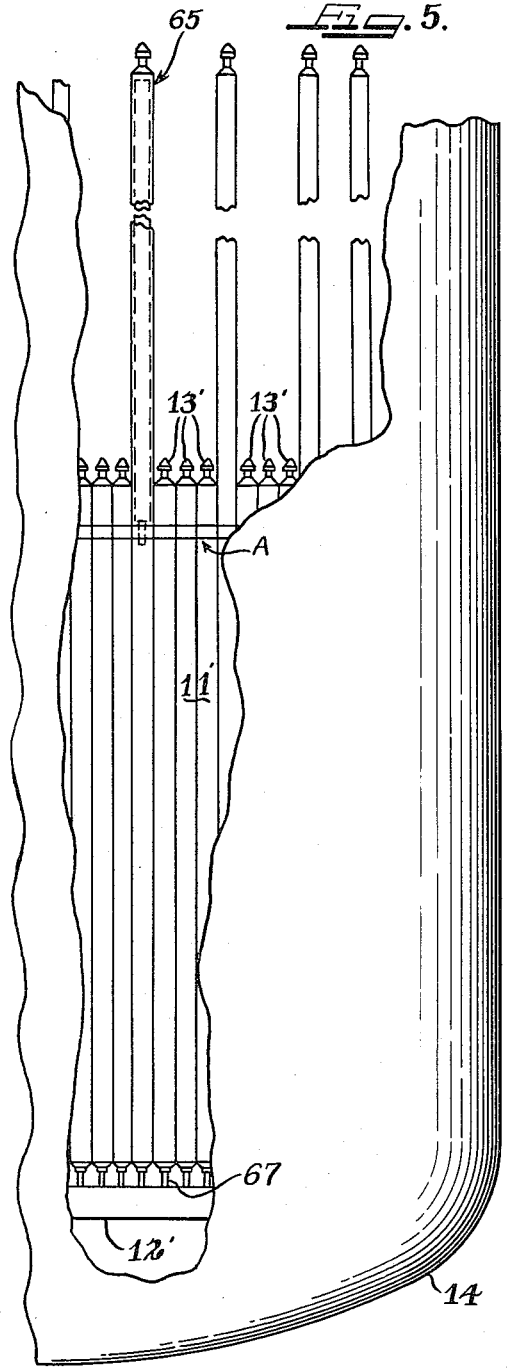
FIGURE 5 is a fragmentary, schematic representation, partly broken away, of the core, fuel elements and modified control rod assemblies in accordance with the present invention.

Generally, in accordance with the present invention, there is provided emergency shutdown apparatus for a nuclear reactor, comprising an emergency control rod comprising neutron-absorbing material, and suspension means disposed above the fissionable material contained in the core. The suspension means includes a temperature-responsive substance by which the compact is attached to the suspension means. The temperature-responsive substance has appreciable structural strength at normal ambient reactor temperature. In accordance with the present invention, failure of the temperature responsive substance allows the emergency control rod, including the neutron absorbing material, to fall to a preselected position in the reactor core, and thereby terminate the chain reaction.

More particularly, as illustrated in FIGURE 1, there is provided a reactor core 11 which includes a generally horizontal grid plate 12 and vertically-extending fuel rods 13 supported by the grid plate and regularly distributed through the core. The core 11 is disposed inside a generally vertically extending pressure vessel 14 through which a gaseous coolant is circulated. The coolant is conducted along a generally upwardly-directed path through the core 11. Fissionable material is contained within the fuel rods 13, up to a level in the core designated by the letter A.

There are also provided a plurality of control rod assemblies 15 which are supported by the grid plate 12 of the core 11 and which are verticaly disposed adjacent the fuel rods 13. For purposes of clarity, only a sufficient number of the control rod assemblies 15 are illustrated as will enable an understanding of the principles of the present invention, it being understood that a sufficient number are provided to enable absorption of sufficient neutrons to control and terminate the chain reaction of the fissionable material contained in the fuel rods 13. Also omitted from FIGURE 1, for purposes of clarity, are control rod drive mechanisms, reactor shielding, coolant circulation means, and other associated apparatus which form no part of the present invention.

As illustrated more clearly in FIGURE 2, each control rod assembly 15 includes a guide tube 17 and a suspension tube 19. The guide tube 17 is rigidly attached at its lower end to the grid plate 12 and is aligned with a bored aperture 21 in the grid plate 12 to provide a generally vertically-extending passageway therethrough. A powered control rod 23 is provided, which is vertically movable relative to the core 11 within the guide tube 17 by means of a drive mechanism (not illustrated) disposed beneath the core 11. Each powered control rod 23 includes hollow cylindrical elements 24 comprising neutron-absorbing material. Means are provided whereby gaseous coolant flows upwardly through the central passageway in the cylindrical elements 24, as well as through the annular passageway between the powered control rod 23 and the rod guide tube 17.

In this connection, the powered control rod 23 may be either an operating control rod, which is normally positioned at an appropriate elevation in the core 11 to provide the desired reactor reactivity, or it may be a scram rod, which is normally in a withdrawn position from the core 11 but which may rapidly be inserted into the core to terminate the chain reaction. The powered control rod 23 is illustrated in FIGURES 1 and 2 in a position whereat it is inserted less than one-half the distance into the core 11 but it will be understood that the powered control rod 23 may be inserted to position A adjacent the top of the fissionable material.

The guide tube 17 has guide slots 25 formed therein on its inner surface, which guide slots extend from a point adjacent the top of the guide tube 17 to a position B generally at the midpoint of the fissionable material contained in the fuel rods 13. The function of the guide slots will be more particularly described hereinafter.

The suspension tube 19 comprises a hollow cylindrical tube resting on the guide tube 17 at the tapered joint 26 and secured thereto in respect of uplift forces by the lugs 28 integral with internal sleeve 34. The lugs 28 are engaged with projections 36 on guide tube 17 by a rotary installation motion.

A cap 27 is threadably connected to the suspension tube 19 at its upper end, and includes a connector or lifting knob 29 which is engageable by grappling means (not illustrated) for inserting or removing the suspension tube 19 from the guide tube 17. The cap 27 includes apertures 30 formed therein, which apertures permit the passage of gaseous coolant outwardly from the interior of the suspension tube 19, as indicated by the arrows.

The control rod assembly 15 further comprises a rod hanger 31. The rod hanger is threadably received in the cap 27 and depends axially downwardly therefrom inside the suspension tube 19.

There is further provided within the suspension tube 19 an emergency control rod 32. The emergency control rod comprises a support sleeve 33 having a bushing 35 and a washer 37 positioned at the upper and lower ends thereof, respectively, and tubular rings 39 comprising compacts of neutron-absorbing or "poison" material disposed about the support sleeve.

As seen more particularly in FIGURE 4, the support sleeve 33 extends through the washer 37, and shock-absorbing discs 41 are disposed below the washer 37 in surrounding relation to the support sleeve 33. The discs 41 comprises resilient spring members, fabricated from stainless steel or the like, which serve to cushion the shock of impact which occurs upon descent of the emergency control rod 32 into the core 11.

Adjacent the discs 41, there is provided a positioning plate 47 which is secured to the support sleeve 33 in axially surrounding relation thereto. As shown particularly in FIGURES 3 and 4, the positioning plate 47 comprises a stainless steel ring member 49 and a ceramic ring member 50. The stainless steel ring member 49 comprises a generally circular member with outwardly projecting lugs or splines 51 disposed about its periphery. The splines 51 of the ring member 49 project into the guide slots 25 for slidable engagement therein, and serve to keep the emergency control rod 32 axially aligned within the guide tube 17 when the emergency control rod 32 is allowed to fall into the core 11. The splines 51 further serve to terminate the downward fall of the emergency control rod 32 at the lower terminus of the guide slots 25, indicated in FIGURE 1 as position B.

The ceramic ring member 50 comprises an annular member which also includes projecting splines 53 about its periphery, which also project into the guide slots 25 of the guide tube 17 in the same manner as the splines 51 of the steel ring member 49, and which serve to retain the emergency control rod 32 in position after falling into the core 11, should the steel ring member thereafter melt under ambient reactor temperatures.

In order to retain the foregoing elements of the emergency control rod 32 in surrounding relation to the support sleeve 33, there is provided a support spider 55 which is secured to the end of the support sleeve 33. The spider 55 includes passageways 57 which allow flow of gaseous coolant into the interior of the support sleeve.

The support spider 55 includes a bore 59 extending axially therethrough, and a suspension sleeve 60 is fixedly received therein and extends downwardly therefrom to provide a housing for the lower end of the rod hanger 31.

As illustrated in FIGURES 2 and 4, the emergency control rod 32 is positioned within the suspension tube 19 in surrounding relation to the rod hanger 31. In order to suspend the control rod 32, there is provided a suspension tip 61 which is secured to the rod hanger by an alloy brazing 63. It will be seen that the suspension sleeve 60 abuts the suspension tip 61 to thereby suspend the control rod 32 in position. The brazing alloy comprises a temperature-responsive alloy which has appreciable strength at normal ambient reactor temperatures, but which has substantially no strength at a preselected abnormal ambient reactor temperature, which abnormal reactor temperature is indicative of a reactor malfunction. The selection of any alloy which melts or otherwise loses its strength at a particular temperature is well known to those skilled in the metallurgical arts, and it is not believed that a more particular description thereof is necessary. It should also be understood that substances other than metallic alloys may also be used under particular circumstances and conditions.

It will be seen that, under normal operating conditions, the emergency control rod 32, including the tubular rings 33 which comprise a neutron-absorbing material, are disposed above the level A of the fissionable material contained in the core, and do not appreciably affect the reactivity of the reactor.

As long as the ambient temperature conditions surrounding the suspension tip 61 and brazing alloy 63 are below the temperature at which the brazing alloy 63 fuses and thereby loses its structural strength, the emergency control rod 32 is retained in this position. However, in any emergency condition in which the ambient temperature conditions surrounding the suspension tip 61 and the brazing alloy 63 reach the preselected fusing temperature of the brazing alloy, the emergency control rod 32 will be released from the rod hanger 31 and will fall into the rod guide tube 17.

In this connection, the loss of flow of coolant through the guide tube 17 would result in a rapid temperature rise, as would any malfunction in which the power level of the reactor increased beyond safe limits.

After release, the emergency control rod 32 will fall until arrested by the powered control rod 23, which should already be at a position of maximum insertion under such emergency conditions. However, if for some reason the powered control rod 23 is inoperative, the emergency control rod 32 will fall until arrested at the termination of the guide slots 25 by impact of the splines 51 of the steel ring member 49. In either event, the resilient discs 41 absorb a portion of the impact energy to protect the integrity of the neutron-absorbing tubular rings 39.

Thus, even though the powered control rod 23 is inoperative, the emergency control rod 32 will automatically be positioned at the midpoint of the core, and the design of the rod is such that sufficient neutrons are absorbed to terminate the chain reaction. This operation is completely independent of any external power source.

Figure 6:
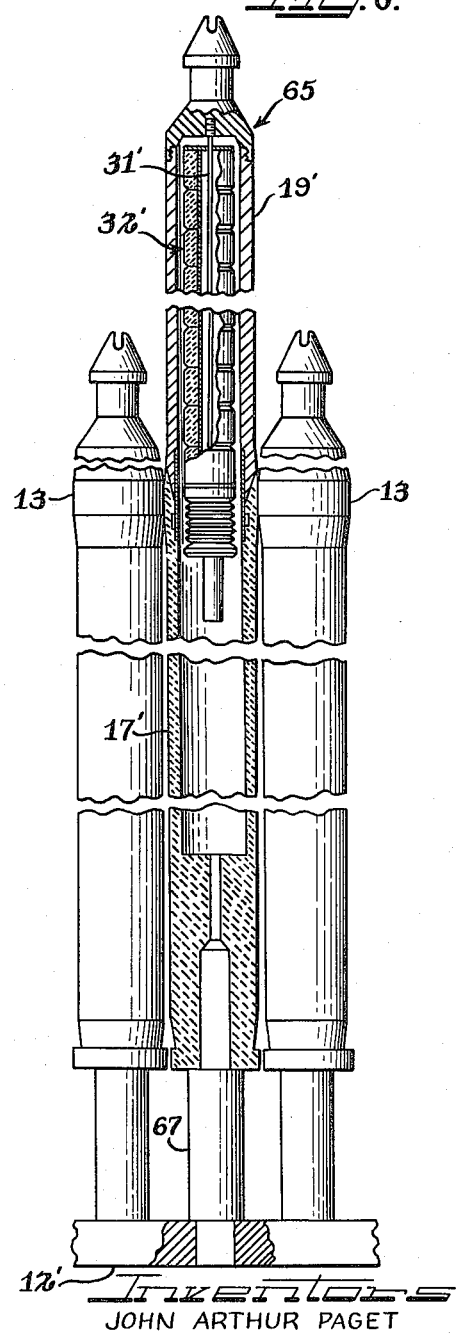
FIGURE 6 is a fragmentary, longitudinal sectional view, partly broken away, of a modified emergency control rod assembly and adjacent fuel rods of FIGURE 5.

Various modifications of the foregoing embodiment will be apparent to those skilled in the art. For example, there is illustrated in FIGURES 5, 6, and 7 a modified embodiment of an emergency control rod assembly 65, in accordance with the present invention, in which corresponding elements are denoted by the same numerals used in the foregoing description, but which are followed by the symbol prime ('). It will be seen that the guide tube 17' of the modified embodiment does not include guide slots therein, and that the guide tube 17' terminates adjacent the grid plate, and is supported upon a standard 67. It will also be seen that the suspension tube 19' extends substantially above the top of the core 11 so as to retain a substantially longer emergency control rod 32' above the level A of the fissionable material.

In the modified embodiment, failure of the brazing alloy 63' at abnormal ambient reactor temperatures allows the emergency control rod 32' to fall until it contacts the bottom of the guide tube 17', at which position the control rod 32' is substantially coextensive with the height of the fissionable material contained in the fuel rods 13' of the core 11'. Thus, a greater quantity of neutron-absorbing material is introduced into the core, reducing the number of emergency control rods 32' which may be required to terminate the chain reaction.

It will be obvious that the foregoing embodiment of apparatus in accordance with the present invention may also be provided with heating means adjacent the brazing alloy, which heating means may be manually activated from without the reactor area to cause failure of the brazing alloy and allow the control rod compact to fall into position within the core. For example, the suspension tip may be surrounded by electrical resistance wire whereby external activation of the heating wire circuit may provide the desired temperature rise.

Although shown and described with respect to particular apparatus, it will be apparent that various modifications might be utilized to advantage without departing from the principles of this invention.

Various of the features of the present invention are set forth in the following claims.

What is claimed is:

1. In a nuclear reactor including a generally vertically extending pressure vessel having a core including fissionable material disposed at the lower portion of the vessel, a guide tube extending from the bottom of said core to a position spaced above the fissionable material, an emergency control rod disposed within said tube and comprising a rod hanger, a neutron absorbing material element coaxially fixed to said rod hanger, a support sleeve fixed to the lower end of said rod hanger and including a plurality of radially projecting splines thereon, means defining guide slots in the inner wall of said tube adapted to be slidably engaged by said splines and thereby guide the control rod during movement axially of said tube, and means connecting said control rod to said tube to releasably maintain the control rod in position at the upper end of the tube and above the fissionable material, said connecting means including a temperature responsive substance arranged and adapted to hold the control rod in its elevated position during ordinary operation of the reactor but which material fuses to permit the control rod to move downwardly relative to said tube and to a position within said core when the temperature in said vessel reaches a predetermined upper limit.

2. In a nuclear reactor including a generally vertically extending pressure vessel having a core including fissionable material disposed at the lower portion of the vessel, a guide tube extending from the bottom of said core to a position adjacent the top of said core, an emergency control rod assembly comprising a suspension tube having its lower end seated in the upper end of said guide tube, an emergency control rod disposed within said suspension tube and comprising a hanger rod, a neutron absorbing material element coaxially fixed to said hanger rod, and means connecting said control rod to said suspension tube to releasably maintain the emergency control rod in position above the fissionable material, said connecting means including a temperature responsive substance arranged and adapted to hold the control rod in its elevated position during ordinary operation of the reactor but which material is fusible to permit the control rod to move downwardly and into said guide tube within said core when the temperature in said vessel reaches a predetermined upper limit.

3. In a nuclear reactor including a generally vertically extending pressure vessel having a core including fissionable material disposed at the lower portion of the vessel, a guide tube extending from the bottom of said core to a position spaced above said core, a powered control rod disposed for movement between a position below said core and a position within said core, an emergency control rod assembly comprising a suspension tube having its lower end seated in the upper end of said guide tube, an emergency control rod disposed within said suspension tube and comprising a hanger rod and neutron absorbing material, and means connecting said emergency control rod to said suspension tube to releasably maintain said emergency control rod in position at the upper end of the suspension tube and above said core, said connecting means including a temperature responsive substance arranged and adapted to hold the emergency control rod in its elevated position during ordinary operation of the reactor but permitting the emergency control rod to move downwardly relative to said suspension tube and within said guide tube in the core when the temperature in said vessel reaches a predetermined upper limit, the position of said powered control rod within said guide tube determining the extent of downward movement of said emergency control rod.

References Cited in the file of this patent

UNITED STATES PATENTS 2,735,811     Weinberg et al.     Feb. 21, 1956

OTHER REFERENCES

Nucleonics, vol. 14, No. 3, March 1956, p. 37.